(12) United States Patent
Tada et al.

(10) Patent No.: US 6,461,465 B2
(45) Date of Patent: *Oct. 8, 2002

(54) APPARATUS FOR MANUFACTURING LIQUID CRYSTAL PANEL AND METHOD THEREOF

(75) Inventors: Masahiko Tada, Kumamoto (JP); Kohei Adachi, Kumamoto (JP); Hiroki Toyoshima, Kumamoto (JP); Susumu Kono, Kumamoto (JP); Kazuo Yoshida, Tokyo (JP); Yoshihiro Kashiba, Tokyo (JP); Yoshimi Kinoshita, Tokyo (JP)

(73) Assignees: Advanced Display Inc., Kikuchi-gun (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/766,980

(22) Filed: Jan. 23, 2001

(65) Prior Publication Data

US 2001/0018948 A1 Sep. 6, 2001

Related U.S. Application Data

(63) Continuation of application No. 09/301,722, filed on Apr. 29, 1999, now Pat. No. 6,190,488.

(30) Foreign Application Priority Data

Jun. 16, 1998 (JP) ............................................. 10-169018

(51) Int. Cl.$^7$ ............................................... B30B 15/06
(52) U.S. Cl. ..................... 156/228; 156/580; 156/583.1
(58) Field of Search .............................. 156/228, 306.6, 156/306.9, 307.1, 307.7, 580, 583.1; 100/305, 315, 321, 326

(56) References Cited

U.S. PATENT DOCUMENTS

| 4,402,785 A | * | 9/1983 | Withers ....................... 156/499 |
| 5,039,371 A | * | 8/1991 | Cremens et al. ............ 156/382 |
| 5,851,342 A | * | 12/1998 | Vydra et al. ................. 156/324 |
| 6,190,488 B1 | * | 2/2001 | Tada et al. ................... 156/228 |

FOREIGN PATENT DOCUMENTS

| JP | 57-188018 | * | 11/1982 |
| JP | 5-232420 | * | 9/1993 |

* cited by examiner

Primary Examiner—James Sells
(74) Attorney, Agent, or Firm—Oblon, Spivak, McClelland, Maier & Neustadt, P.C.

(57) ABSTRACT

An apparatus for manufacturing a liquid crystal panel in which two substrates are faced to each other with spacers interposed therebetween, applied with heat pressure in an overlapped condition, and adhesive arranged between the two substrates is cured for fixing, characterized in that at least of a pair of pressurizing plates for applying pressure to the two substrates is a graphite plate and in that upper and lower pressurizing plates are made to be of different rigidity. The graphite plate of low rigidity is made to stick to the substrate, and shifts between substrate can be prevented while securing uniformity in gap between substrates.

8 Claims, 7 Drawing Sheets

APPARATUS FOR MANUFACTURING LIQUID CRYSTAL PANEL AND METHOD THEREOF

This application is a Continuation of application Ser. No. 09/301,722 Filed on Apr. 29, 1999, U.S. Pat. No. 6,190,488.

BACKGROUND OF THE INVENTION

The present invention relates to an apparatus for manufacturing a liquid crystal panel and a method thereof. More particularly, it relates to an apparatus for manufacturing a liquid crystal panel and a method thereof in which two substrates are faced to each other with spacers interposed therebetween, and while applying pressure to these substrates, adhesive arranged at peripheral portions are cured to be adhered to the substrates.

Figure 6:
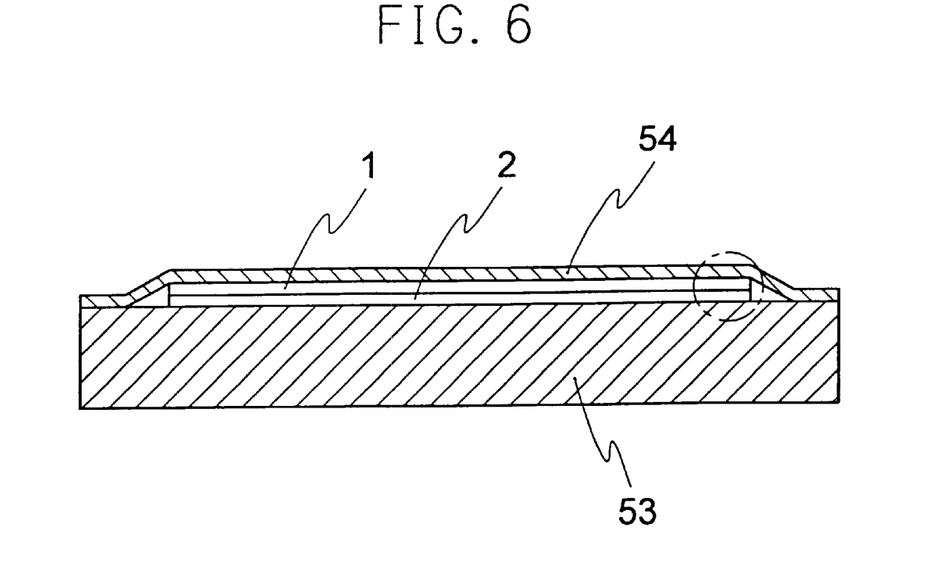
FIG. 6 is a schematic, sectional view showing an example of a conventional apparatus for manufacturing a liquid crystal panel.
Figure 7:
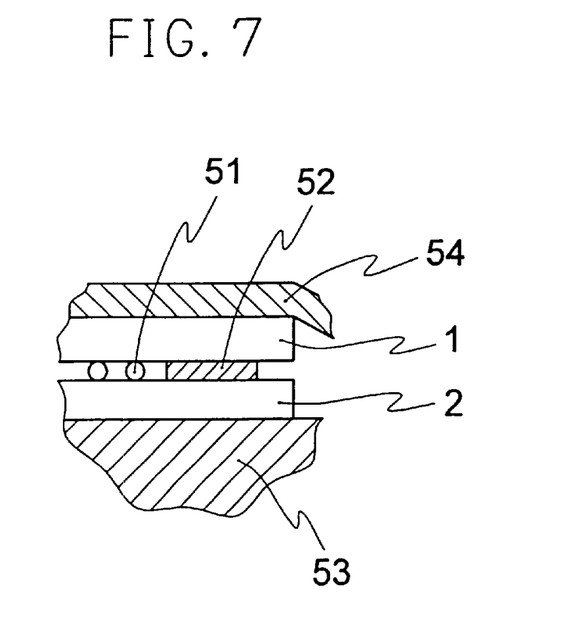
FIG. 7 is an enlarged, sectional view of a corner portion of the substrate of FIG. 6.

FIGS. 6 and 7 are schematic, sectional views for explaining a manufacturing method by means of a fixing apparatus for a liquid crystal panel as described in Japanese Unexamined Patent Publication No. 88018/1982. In FIGS. 6 and 7, 1 and 2 denote a pair of upper and lower substrates which are a color filter substrate and a TFT substrate having desired patterns formed thereon. Between the upper substrate 1 and the lower substrate 2, there are provided a plurality of spacers 51 of approximately 5 microns for maintaining the clearance, and the upper substrate 1 and the lower substrate 2 are fixedly attached together at their peripheral portions via adhesive 52. This adhesive 52 finally serves as a bulkhead for enclosing liquid crystal within the substrates 1,2. 53 denotes a base (surface plate) that is made, for instance, of stainless steel, and 54 denotes a bendable material which covers at least one of the substrates. The bendable material might be a polyester film or silicone rubber sheet.

According to this conventional manufacturing method for a panel, the spacers 51 are dispersed on an inner surface of either of the upper and lower substrates 1,2 and after applying adhesive to a peripheral portion of the other substrate, both are overlapped at high positioning accuracy. Further, the whole temperature is raised while applying pressure to the substrates, the adhesive 52 is cured, and the upper and lower substrates 1,2 are fixedly attached together without generating any shifts.

At this time, the substrates are maintained in a vessel comprising at least partly of a bendable material, at least one of the substrates is covered with the bendable material, and fixing of the substrates is performed in a condition in which the interior of the vessel is decompressed or pressure is applied on the vessel from the exterior. By the above arrangements, pressure can be applied to the substrates in an uniform manner.

Such a method in which the substrates are applied with pressure by means of a material having bendable characteristics is effective in remarkably improving the uniformity of pressure application than compared to methods in which surface plates of high rigidity are employed. Consequently, irregularities or uniformities in display owing to deficiencies in gaps can be decreased.

Figure 8:
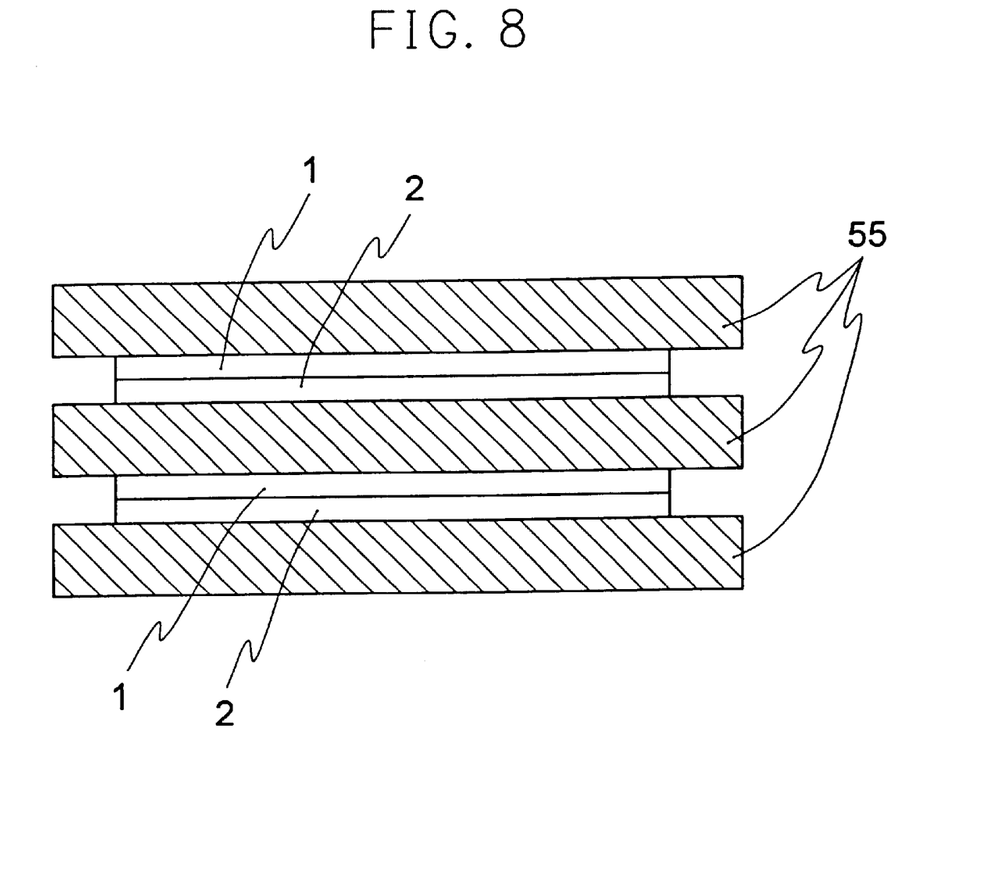
FIG. 8 is a schematic, sectional view showing another example of a conventional apparatus for manufacturing a liquid crystal panel.

A manufacturing method for panels employing a heating method is proposed in Japanese Unexamined Patent Publication No. 232420/1993. As shown in FIG. 8, there are respectively provided a plurality of hot plates 55 above and below substrates 1,2 in this method so that the whole panel can be heated. With this arrangement, characteristics such as rapid heating and soaking can be improved than compared to a method in which a side surface of the panel is heated employing a heater in a furnace.

However, while the manufacturing method according to FIGS. 6 and 7 is effective to some extent with respect to deficiencies in gaps, it cannot prevent shifts in lateral directions of the upper and lower substrates 1,2 or generation of wraps in the substrates. Especially in cases in which two pairs of substrates have been arranged in an aligning manner in a single vessel for the sake of improving productivity, it was found that the shift in lateral directions became larger. Further, this method presents a drawback that the substrates are apt to camber, depending on the way of heat transmission, since heating of the substrates 1,2 is performed in a furnace. That is, when heat is transmitted from downward the furnace, there is generated wrap like a bimetal, since the surface plate 53 of stainless steel is first heated, and since the thermal expansion coefficient of the surface plate 53 of stainless steel is larger than those of the substrates 1,2. If the wrap in the substrate becomes not less than a certain value, it cannot be assembled into a product and thus becomes a defective article. Especially, since requirements with respect to shapes of substrates are becoming increasingly higher accompanying requirements of thin-sizing of products in these years, this results in a drawback that the yield is further decreased. In case a gradually heating process or a method in which the rigidity is increased (the thermal capacity is increased) is employed for the sake of preventing cambers, it will not be acceptable in terms of productivity.

On the other hand, in the method of FIG. 8 in which hot plates 55 are employed, heat is transmitted from the upper and lower substrates so that occurrence of wraps is decreased; however, it cannot prevent shifts of the upper and lower substrates in lateral directions by several $\mu$m, and in case request for the positioning accuracy become higher for the sake of improving the performance of liquid crystal, shifts between substrates will not be within acceptable values. Further, it has become relevant from experiments that in the prior art arrangement, the amount of shift became larger, than compared to a case in which the substrates 1,2 are disposed in the center of the surface plate, when they were shifted from the center or when small substrates have been disposed in an aligning manner. From these results, it has become relevant from experiments that shear stress is generated between the surface plate and the substrate and between both substrates owing to differences in coefficients of thermal expansion of upper and lower surface plates or differences in friction coefficients between a surface plate and a substrate depending on the position of the substrates and the upper and lower surface plates. Power is most apt to be released especially between substrate 1 and substrate 2 that are adhered to each other only at their peripheral portions by means of soft adhesive (that is cured after heating) so that shift is generated between the substrates 1,2.

While increase of thermal capacity of the hot plates is effective for securing soaking characteristics in this conventional method, it presented a drawback that this was performed at the expense of heating/cooling speed.

Further, in surface plates made of stainless steel that are designed to be flat at a room temperature, undulations might occur in the surface plates themselves depending on the temperature distribution in the surface plates. Therefore, there was presented a drawback that wraps occurred in substrates that were fixedly attached as to be parallel thereto at a certain area of dispersion.

The present invention has been made in view of the above circumstances, and it is an object thereof to provide a manufacturing apparatus for a liquid crystal panel and a method thereof capable of decreasing amounts of overlapping shifts after fixing two substrates.

SUMMARY OF THE INVENTION

In accordance with a first aspect of the present invention, there is provided an apparatus for manufacturing a liquid crystal panel in which two substrates are faced to each other with spacers interposed therebetween, applied with heat and pressure in an overlapped condition, and adhesive arranged between the two substrates is cured for fixing, characterized in that at least one of a pair of pressurizing plates for applying pressure to the two substrates is a graphite plate and in that upper and lower pressurizing plates are made to be of different rigidity.

It is preferable that at least one of the pressurizing plates is of a multi-layered arrangement, and a graphite plate is employed as a part of the multi-layered arrangement.

The pressurizing plate of multi-layered arrangement is preferably provided with an inner space in at least one point positioned between the layers.

It is preferable that the pressurizing plate of multi-layered arrangement is provided with a path for cooling at a nearer side with respect to the substrate and with a heater at a farther side with respect to the substrate.

A coating film is preferably provided on a surface of the graphite plate.

It is preferable that a graphite plate of high rigidity is fixed to a base by means of a pin or a heat insulator in order to deform a surface of the graphite plate in a convex or concave manner.

It is preferable that there is provided a mechanism in which a closed space is formed by means of a pressurizing plate of low rigidity and an upper lid, and a substrate disposed in an exterior space with respect to the closed space is applied with pressure by making a pressure of the closed space higher relative to the exterior space.

It is preferable that a frame body of a thickness approximately identical to that of the two substrates is arranged between the pair of pressurizing plates as to enclose the substrates, wherein the frame body is formed of tungsten, molybdenum, alloys thereof, graphite or iron-nickel alloy.

It is preferable that differences in level are provided in the frame body, wherein the differences in level are set such that a height of an inner surface located on the side of the substrate is identical to or lower than the height of the substrate, and that a height of an outer surface on the opposing side is higher than the height of the inner surface.

In accordance with a second aspect of the present invention, there is further provided a method for manufacturing a liquid crystal panel in which two substrates are faced to each other with spacers interposed therebetween, applied with heat and pressure in an overlapped condition, and adhesive arranged between the two substrates is cured for fixing, characterized in that at least one of a pair of pressurizing plates for applying pressure to the two substrates is a graphite plate and in that upper and lower pressurizing plates are made to be of different rigidity.

According to the present invention, the arrangement for applying pressure to the substrates is composed of a graphite plate of thermal expansion coefficient close to that of a glass substrate and of a plate of low rigidity, and the pressurizing plate of low rigidity is made to stick to the substrate by providing differences in rigidity, shifts in substrates can be prevented while securing uniformity in gaps between substrates.

According to another embodiment of the present invention, at least one of the pressurizing plates is made to be of multi-layered arrangement, and graphite plate is used at a part thereof. Further, a space has been provided at least at one portion between layers of this pressurizing plate of multi-layered arrangement. With these arrangements, soaking characteristics and flatness of the graphite plate can be improved.

According to a further embodiment of the present invention, the pressurizing plate of multi-layered arrangement is provided with a path for cooling on a nearer side with respect to the substrate and a heater on a farther side with respect to the substrate. With this arrangement, rapid cooling/heating is enabled.

According to a yet further embodiment of the present invention, a coating film is provided on the surface of the graphite plate. With this arrangement, long life of the graphite plate is enabled, and improvements in yield are also enabled.

According to a still further embodiment of the present invention, in order to deform the surface of the graphite plate in a convex or concave manner, the graphite plate of high rigidity is fixed by means of a plurality of pins or heat insulator. With this arrangement, it is enabled to control the shape of the finished substrate.

According to another embodiment of the present invention, there is provided a mechanism in which a closed space is formed by means of a pressurizing plate of low rigidity and an upper lid, and a substrate disposed in an exterior space with respect to the closed space is applied with pressure by making a pressure of the closed space higher relative to the exterior space. With this arrangement, occurrence of bubbles is prevented since adhesive that is applied between the substrates will not be exposed to decompression, and consequently, leakage of liquid crystal can be prevented.

According to a further embodiment of the present invention, a frame body of a thickness approximately identical to that of the two substrates is arranged between the pair of pressurizing plates as to enclose the substrates, wherein the frame body is formed of tungsten, molybdenum, alloys thereof, graphite or iron-nickel alloy. With this arrangement, the pressurizing plates are made to uniformly contact with the substrates in flat conditions.

According to a still further embodiment of the present invention, differences in level are provided in the frame body, wherein the differences in level are set such that a height of an inner surface located on the side of the substrate is identical to or lower than the height of the substrate, and that a height of an outer surface on the opposing side is higher than the height of the inner surface, so that the pressure in the peripheral portions of the substrates can be heightened and the adhesive can be smashed in a stable manner. With this arrangement, shifts of substrates can be further decreased and uniformity in gaps between substrates can be secured.

According to the method of the present invention, two substrates are applied with pressure by employing a graphite plate for at least one of a pair of pressurizing plates for applying pressure to the two substrates and upper and lower pressurizing plates are made to be of different rigidity. With this arrangement, the graphite plate of low rigidity is made to stick to the substrate so that shifts between substrates can be prevented while securing uniformity in gaps between substrates.

DETAILED DESCRIPTION

EMBODIMENT 1

Figure 1:
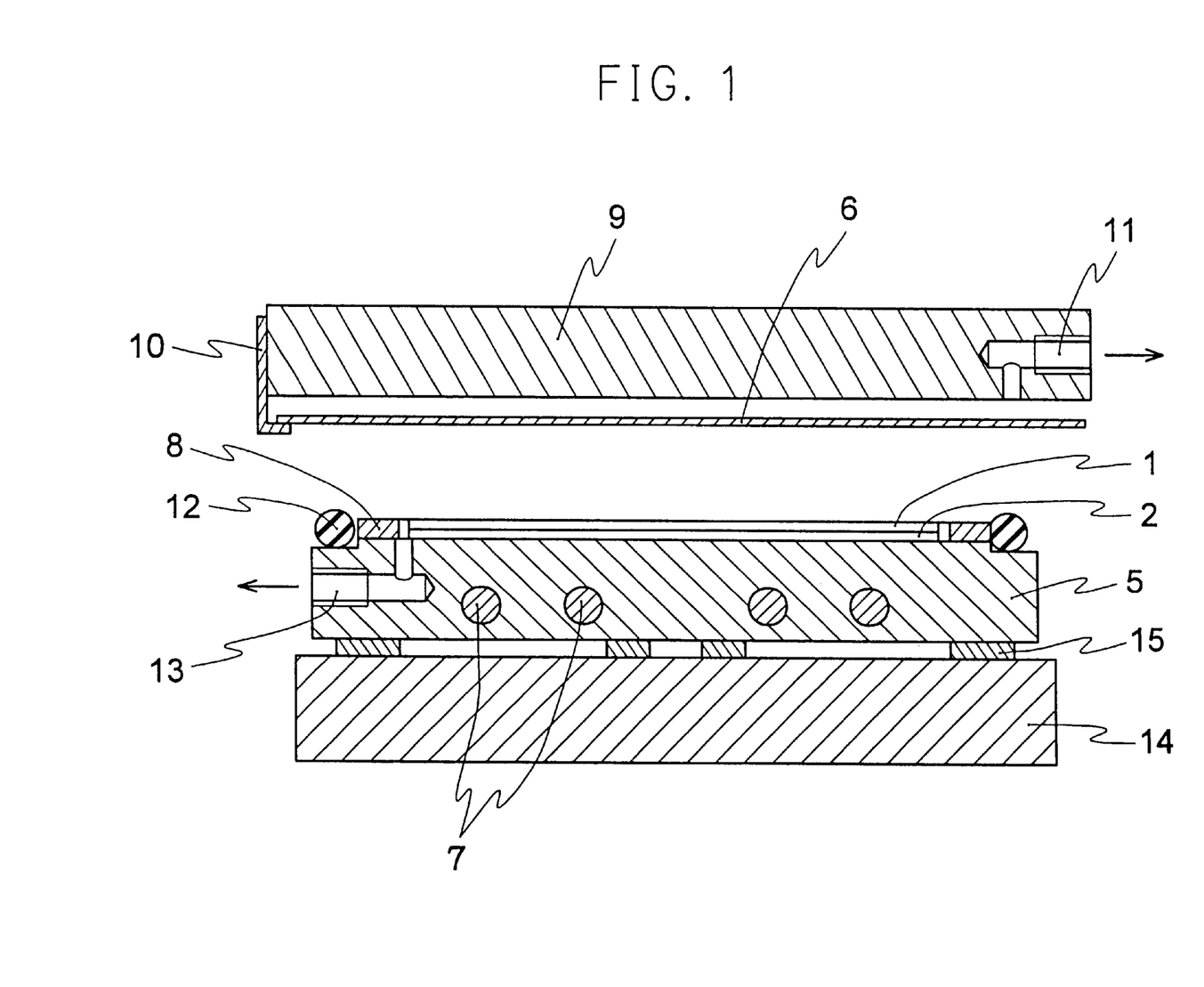
FIG. 1 is a schematic, sectional view showing an embodiment of an apparatus for manufacturing a liquid crystal panel according to the present invention.

A manufacturing apparatus for a liquid crystal panel according to an embodiment of the present invention and a method thereof is shown in FIG. 1. 1,2 denote upper and lower substrates, 5 a graphite plate of high rigidity which is a pressurizing plate, and 6 a graphite plate of low rigidity which is another pressurizing plate. In this embodiment, four heaters 7 for heating are inserted into the graphite plate 5 of high rigidity. In order to secure soaking characteristics of the surface of the graphite plate 5, the heaters 7 are preferably set to be as remote as possible from the substrate 2. Further, 8 is a frame body disposed as to enclose around the substrates 1,2, which thickness is identical to that of the total thickness of the substrates 1,2. 9 is an upper lid for supporting the graphite plate 6 of low rigidity wherein the graphite plate 6 of low rigidity is supported by means of a hook 10 and a hook (not shown). On the upper lid 9, there is provided a suction hole 11 so that the graphite plate 6 of low rigidity can be made to stick to the upper lid 9 by performing vacuum drawing. 12 denotes an O ring comprising elastic member which is deformed when the graphite plate 5 of high rigidity and the graphite plate 6 of low rigidity are overlapped with each other and cuts off the interior surrounded by the graphite plates 5,6 and the exterior, wherein the interior is enabled to perform vacuum exhaust by means of vacuum piping 13. 14 denotes a base onto which the graphite plate 5 of high rigidity is placed via heat insulator 15 which might, for instance, be ceramics.

Basic operations will now be explained. As shown in FIG. 1, the substrates 1,2 are disposed onto the graphite plate 5 while the graphite plate 5 of high rigidity and graphite plate 6 of low rigidity are in opened conditions. Then, the upper lid 9 is descended so that the graphite plate 5 of high rigidity and graphite plate 6 of low rigidity come in contact via the O ring 12. At this time, the graphite plate 6 of low rigidity is set to be apart from the hook 10 and not to contact the upper lid 9. That is, the graphite plate 6 of low rigidity is maintained in a freely deformable condition. With this arrangement, the graphite plate 6 of low rigidity is made capable to follow the substrate 1 also in case the apparatus is heated/cooled. On the contrary, in case the graphite plate 6 of low rigidity is fixedly attached to the hook 10 for maintaining the plate, there is presented a drawback that occurrence of a wrap in the graphite plate 6 of low rigidity is by all means unavoidable due to thermal deformation. Next, in case the interior enclosed by the graphite plates 5,6 is vacuum exhausted via the vacuum piping 13, the graphite plate 6 of low rigidity deforms and sticks as to be parallel to the substrate 1 without being restrained by any other members. Then, the graphite plate 5 of high rigidity is heated by the heaters 7, the substrates 1,2 are heated through heat transmission and are fixedly attached to each other through adhesive, similarly to conventional methods. Though the substrates 1,2 or graphite plates 5,6 are thermally expanded accompanying the heating, shifts can be restricted since the thermal expansion coefficients of the substrates 1,2 and the graphite plates 5,6 are substantially identical.

After expiry of a predetermined time necessary for the curing of the adhesive, the heaters 7 are turned off, the pressure of the interior is returned to atmospheric pressure, and the upper lid 9 is lifted to take the substrates 1,2 out. At this time, by making the graphite plate 6 of low rigidity sucked at the upper lid 9, it is made possible to rapidly cool the graphite plate 6 of low rigidity to the temperature of the upper lid 9. These operations are repeated so that other substrates 1,2 are fixedly attached to each other. It should be noted that while graphite plates are employed as the pair of pressurizing plates for applying pressure to the two substrates in this embodiment, the present invention is not limited to this, and out of the pair of pressurizing plates, at least one of the pressurizing plates might be of graphite plate and the upper and lower pressurizing plates might be set to be of different rigidity.

Further, the same effects can be obtained by using polytetra phloroethylene (PTFE) sintered glass fiber cloth of a similar thermal expansion coefficient instead of using a graphite plate 6 of low rigidity. However, though favorable effects could be obtained at initial stages of manufacturing when using a molybdenum plate which is a metal material of similar thermal expansion coefficient, it was found that repetitive usage thereof presented a drawback that the flatness was gradually degraded and deficiencies in gap or shifts occurred between the substrates 1,2. This is considered to be due to the fact that plastic deformation which is characteristic to metal materials locally occurs while repetitive heating/cooling is performed. Experiments have also been made with molybdenum of various thickness; however, in case the thickness is increased to a thickness at which no variations in flatness occur, the bendability which is a primary purpose was lost and resulted in deficiencies of gaps owing to occurrences of irregularities in pressure, or shifts occurred owing to unevenness in frictional force, and consequently, it was not suitable for usage.

By employing the above arrangements and processes, it has been enabled to avoid occurrence of shifts between the substrates 1,2. That is, the arrangement according to this embodiment is capable to largely decrease shear stress generated between substrates.

EMBODIMENT 2

Figure 2:
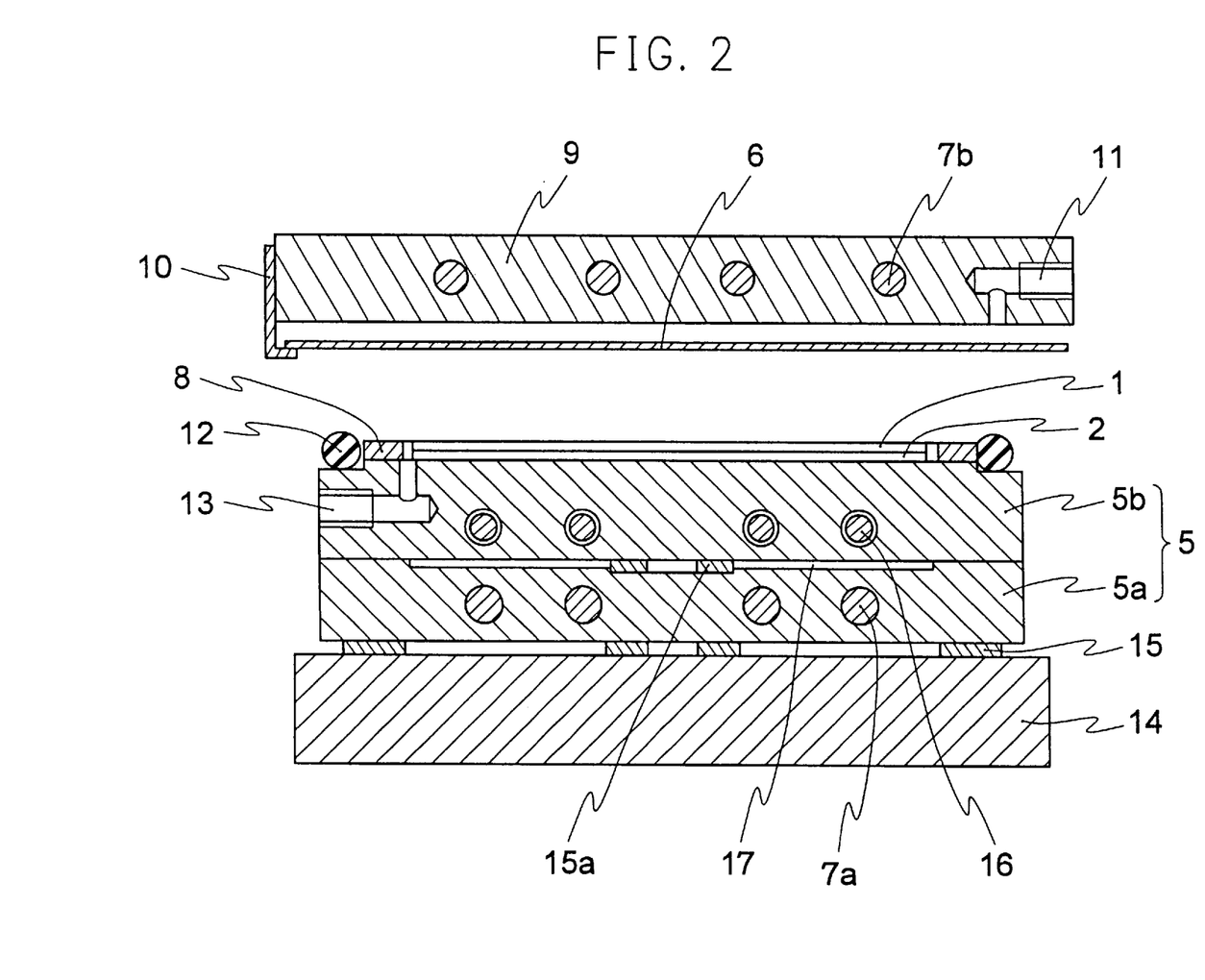
FIG. 2 is a schematic, sectional view showing another embodiment of an apparatus for manufacturing a liquid crystal panel according to the present invention.

While the graphite plate 5 of high rigidity has been arranged to be of a single-layered arrangement in Embodiment 1, soaking characteristics of temperature within the graphite plate can be secured by arranging it to be of multi-layered arrangement. A sectional view of an apparatus for manufacturing a liquid crystal panel of this arrangement is shown in FIG. 2. For the multi-layered structure, an inner space 17 is provided between a first graphite plate 5a of high rigidity into which a heater 7a is inserted and a second graphite plate 5b of high rigidity into which a cooling water piping 16 is inserted, and a heat insulator 15a of ceramics is disposed into the inner space 17. The heat insulator 15a functions as spacers for restricting deformation of the graphite plate 5b due to existence of the inner space 17. An example is shown in which a second heater 7b is provided at the upper lid 9.

Operations of the above described arrangement will now be explained. First, the first graphite plate 5a of high rigidity is heated by the heater 7a. At this time, heat is conducted to the second graphite plate 5b of high rigidity via a peripheral portion of the first graphite plate 5a of high rigidity and, though only by small amounts, via the heat insulator 15a, and simultaneously, heat is transferred to the second graphite plate 5b of high rigidity via an air layer of the inner space 17. In case the plate is not of multi-layered arrangement, it is general that the temperature of the central portion becomes high; however, by inserting the heater 7a into the first graphite plate 5a of high rigidity that is remote from the substrates 1,2, the heat flow through the heat conduction from the peripheral portion becomes large, whereby it is enabled to heat the substrates 1,2 in a soaking manner. It should be noted that the temperature distribution can be controlled by altering the area of contact of the peripheral portion, the material for the heat insulator 15a or the contact area thereof, or the thickness of the air layer. At this time, by simultaneously inserting a second heater 7b into the upper lid 9, the graphite plate 6 of low rigidity can be indirectly heated, whereby the temperature distribution of the whole apparatus can be made uniform and the soaking characteristics of the substrates 1,2 can be further improved. Also, since the second heater 7b is an auxiliary heater that does not contact the substrates 1,2, the temperature of both heaters need not be controlled to be identical as was the case with conventional heaters, and the temperature shall be set to be close to that of the heater 7a. It should be noted that the reason for heating the substrates 1,2 in a soaking manner is that bows and shifts can be prevented since both of the substrates exhibit identical amounts of shrinkage at the time of cooling the substrates 1,2. After fixing of the substrates 1,2, rapid cooling is enabled by making, for instance, water flow through the cooling water piping 16, and the efficiency of product manufacturing can be improved. In this embodiment, the multi-layered arrangement makes it possible to decrease the interchange of heat between the first graphite plate 5a of high rigidity and second graphite plate 5b of high rigidity than compared to that of an uniform arrangement, whereby enabling simultaneous use of cooling water and heater, and exhibits a characteristic that the second graphite plate 5b of high rigidity can be rapidly heated by, for instance, terminating supply of cooling water while the heater 7a is being used.

It should be noted that while the multi-layered structure in this embodiment is a two-layered structure, the present invention is not limited to a two-layered structure as long as heat from the heater is not directly transmitted to the substrates. Thus, in case the pressurizing plate which directly contacts the substrates is formed of a second graphite plate 5b of high rigidity of which thermal expansion coefficient is substantially identical to that of the substrates, it is not necessarily required that the first graphite plate 5a of high rigidity be a graphite plate, and the same effects can be obtained when it is formed of a metal material of which thermal expansion coefficient is different from that of the substrates, for instance, stainless steel, aluminum, or iron.

Further, by providing a coating film of, for instance, glass on the surface of the graphite plate disposed on the side of the substrate, a portion at which it contacts the substrates 1,2 can be prevented from attrition also in repetitive manufacturing. With this arrangement, occurrence of deficiencies in products due to wear powder (contamination of foreign matters) can be prevented. Moreover, the coating film serves to decrease the abrasion coefficient with respect to the substrates, and this action also provides the effect of preventing shifts.

EMBODIMENT 3

Figure 3:
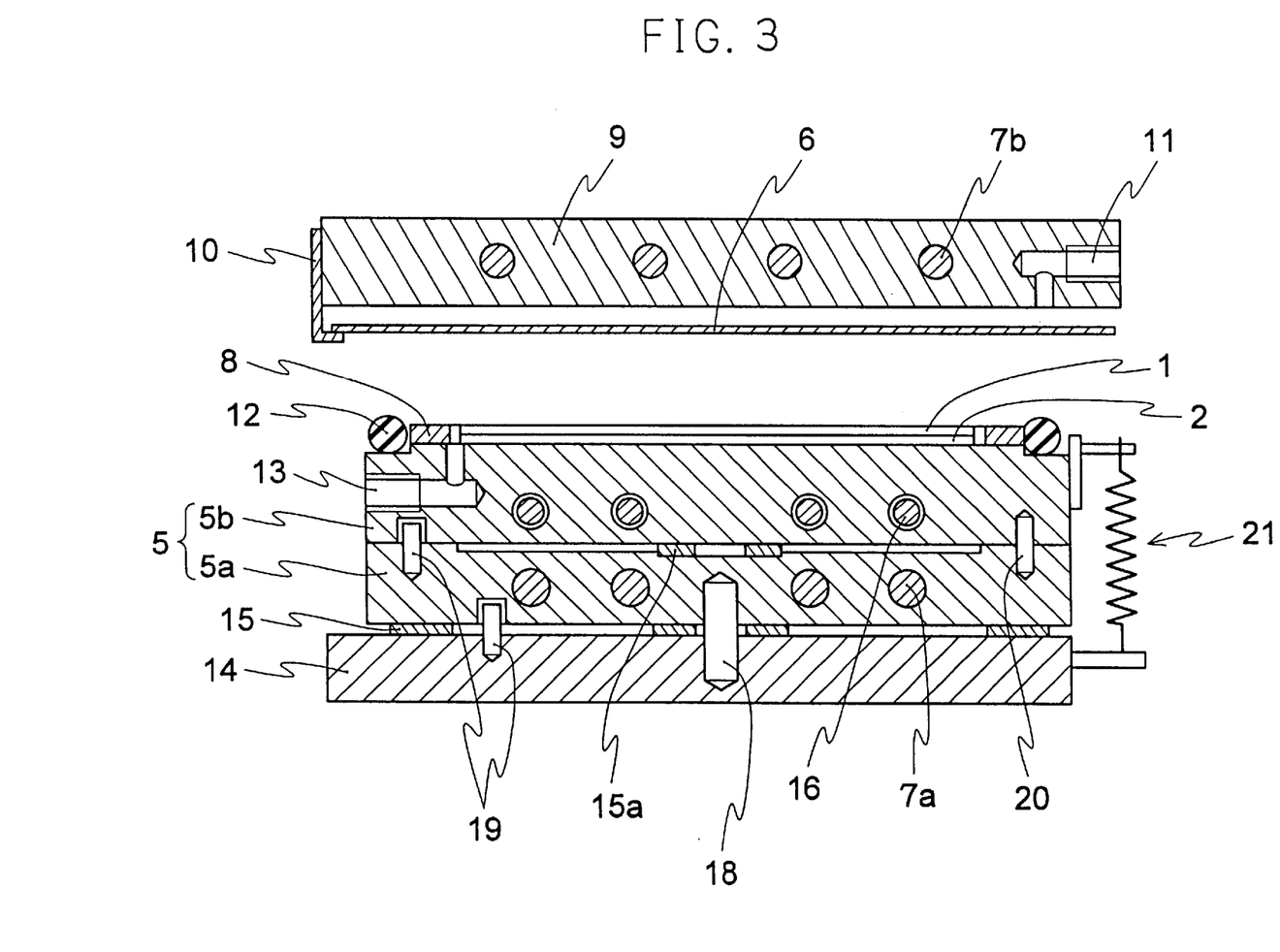
FIG. 3 is a schematic, sectional view showing a still another embodiment of an apparatus for manufacturing a liquid crystal panel according to the present invention.

While there have been explained in Embodiments 1 and 2 arrangements for manufacturing while preventing wrap in the substrates 1,2 as much as possible, it will be explained in this embodiment an arrangement in which the substrates are controlled to assume a desired shape. First, a liquid crystal panel is generally preferred to assume a flat surface condition, and it is required to prevent a display portion of the liquid crystal panel from being disordered by external pressure or vibration. This requirement becomes increasingly important accompanying the thin-sizing of the liquid crystal panel. However, it has been known for a drawback in conventional art that the higher the accuracy required for the substrate becomes, the more the yield decreases. In this connection, it has been found that disorder of a display portion of a liquid crystal panel can be restricted by deliberately forming the substrate, for instance, in a slightly convex manner. FIG. 3 is an arrangement for an apparatus for realizing this, and 1 to 16 denote elements having identical or equivalent functions as those of Embodiment 2. 18 denotes a center pin which functions to push the multi-layered graphite plate of high rigidity up. The center pin 18 is, for instance, threaded with screw grooves, and its height can be adjusted. 19, 20 respectively denote a rotation stopping pin and a positioning pin, and 21 is a spring mechanism for pressing the peripheral portion of the graphite plate down (while FIG. 3 shows only one point, there are required at least two points and a curved surface is formed with more points, depending on the shape of the substrate). With these arrangements, the shape of the graphite plate 5, that is, the shapes of the substrates 1,2 can be controlled by pushing up with the center pin 18 and pressing down with the spring mechanism 21. It should be noted that play is permitted to the positioning pin 20 since the graphite plate is required to be cambered.

Further, by controlling the thickness of the heat insulator 15a, the shape of the graphite plate 5b, that is, the shapes of the substrates 1,2 can be controlled as well. Examples of suitably used materials for the heat insulator 15a are, for instance, silica glass or glass epoxy.

In case the graphite plate of high rigidity has been made to be of multi-layered arrangement, there can be obtained an effect that when deforming the same to assume a curved surface, the graphite plate will not be destroyed by bending stress and that it can also be bent at small power since gliding between layers is enabled. Consequently, the bending mechanism can be simplified by making the graphite plate of high rigidity to be of multi-layered arrangement.

It should be noted that while the substrate is made to be deformed in a convex manner in this embodiment, the present invention is not limited to this, and the substrate might alternatively deformed in a concave manner. Further, the present invention is not limited to be of a multi-layered structure, and the substrate might be deformed in a convex or concave manner in a single-layered structure.

EMBODIMENT 4

Figure 4:
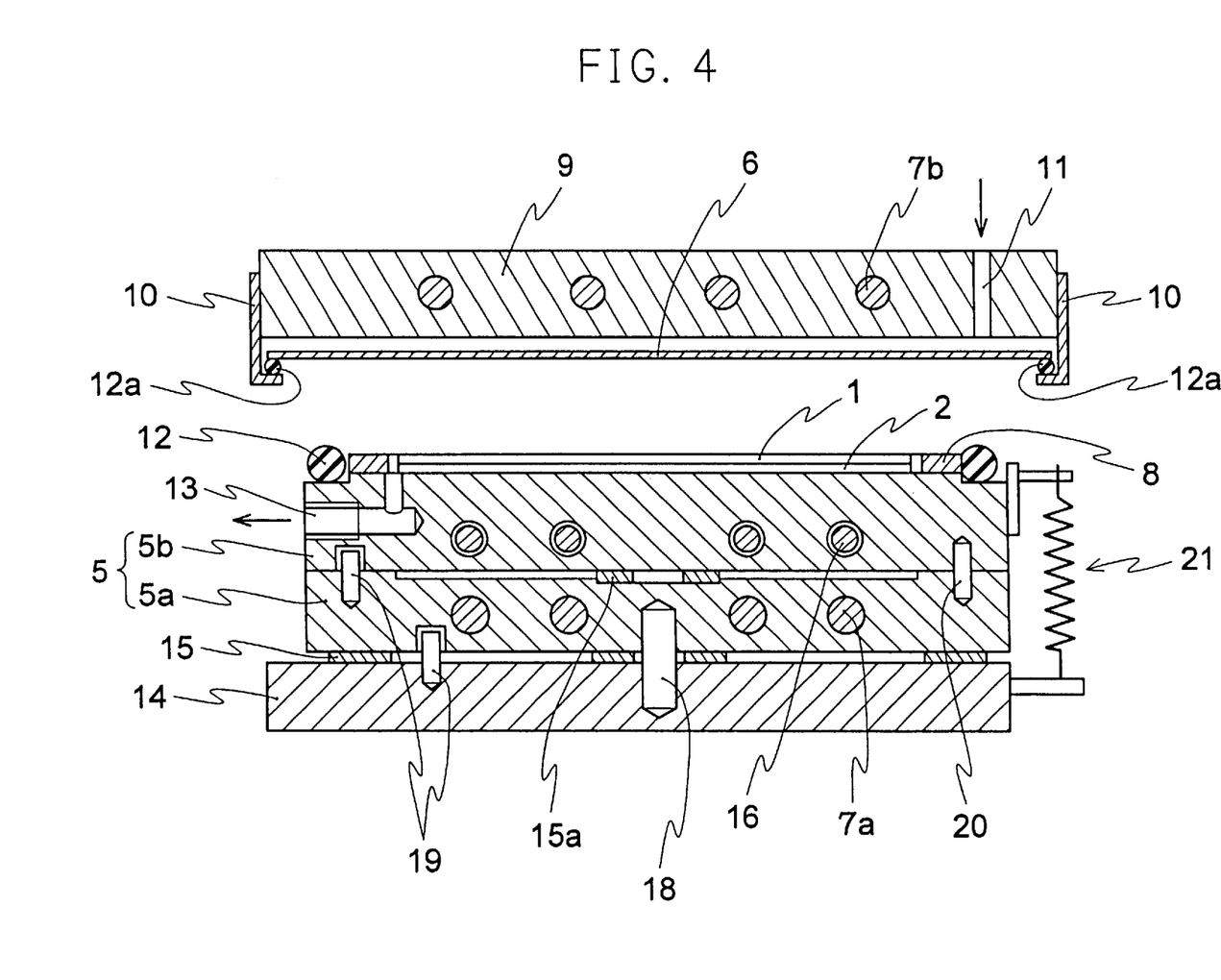
FIG. 4 is a schematic, sectional view showing a yet another embodiment of an apparatus for manufacturing a liquid crystal panel according to the present invention.

FIG. 4 is a sectional view showing still another embodiment of the present invention. In the arrangement of this embodiment, a second O ring 12a is interposed between the graphite plate 6 of low rigidity and the hook 10, and the suction hole 11 is made to be a hole for applying pressure, whereby the graphite plate 6 of low rigidity that is supported by the hook 10 and the second O ring 12a forms a closed space together with the upper lid 9.

Operations will now be explained. Air is injected from the suction hole 11 into the closed space so that the pressure therein is made slightly higher than the atmospheric pressure. Then, the upper lid 9 is descended until the graphite plate 6 of low rigidity contacts the O ring 12. Thereafter, the pressure is further raised to make the graphite plate 6 of low rigidity stick to the substrate 1. At this time, a closed space is formed by the graphite plate 5a of high rigidity, the O ring 12, and the graphite plate 6 of low rigidity, while the vacuum piping 13 is set to be at least in a released condition for drawing air therefrom or is slightly vacuum drawn simultaneous with the formation of the closed space. It should be noted that in case no vacuum drawing is performed, the O ring 12 might also be omitted.

It is an characteristic of the present invention that the graphite plate 6 of low rigidity is not restrained. Thus, in case pressure is applied while the distance between the upper lid 9 and the graphite plate 5 of high rigidity is remote, the graphite plate 6 of low rigidity is excessively bent so that it is detached from the O ring 12a, thus, the above-mentioned operations are performed.

By the above-mentioned operations, the substrates 1,2 can be uniformly applied with pressure similarly to the Embodiments 1 to 3 at substantially atmospheric pressure. The purpose for employing this arrangement is for enabling application of pressure to the substrates 1,2 at substantially atmospheric pressure. In conventional methods, it had been considered that no differences existed in characteristics of products in case differences in pressure occurred in the interior and exterior of the closed space, regardless whether the interior is set to vacuum or the exterior is set to be not less than atmospheric pressure. However, considerations indicated that the yield of products was improved by setting the substrates to atmospheric pressure. That is, in case the substrates 1,2 are disposed in a vacuum condition for heating, it could cause, though in small amounts, generation of voids in fixing adhesive, and this void would cause leakage of liquid crystal when liquid crystal was injected between the substrates 1,2. While Japanese Unexamined Patent No. 188018/1982 disclosed a method in which the whole bendable material covering substrates was put into a pressurizing vessel for applying pressure thereto, the provision of holding down from a side of the substrates and exhausting gas in the interior of the substrates to the exterior in the present invention, it has been enabled to provide products of simple arrangements at high productivity and in a stable manner.

EMBODIMENT 5

In the preceding embodiments, the frame body 8 has been provided to enclose the substrates 1,2, and the frame body 8 has also been made of tungsten, molybdenum, alloys thereof, graphite or iron-nickel alloy. Accompanying the heating and cooling of the graphite plates 5,6, the frame body 8 is also heated and cooled, wherein the shear stress occurring between materials of the substrates 1,2 and the frame body 8 would be made minimum since the thermal expansion coefficients of the substrates 1,2 and the frame body 8 are substantially made to be identical. Consequently, the graphite plates are made to uniformly contact the substrates in flat conditions.

Figure 5:
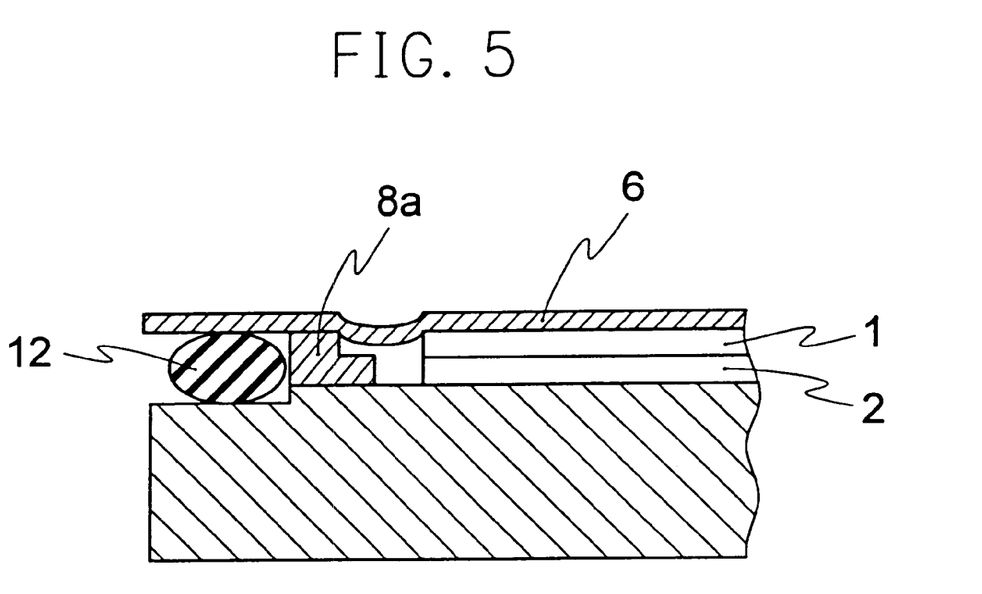
FIG. 5 is a schematic, sectional view showing another embodiment of an apparatus for manufacturing a liquid crystal panel according to the present invention.

In this embodiment, differences in level have been provided in frame body 8a as shown in FIG. 5, and the differences in level are set such that the height of the inner surface located on the side of the substrates 1,2 is identical to or lower than the height of the substrates, and that the height of the outer surface on the opposing side thereof is higher than the height of the inner surface. With this arrangement, since force is acting on the graphite plate 6 of low rigidity so as to deform to the side of the substrate 1, the graphite plate 6 of low rigidity is slightly bent to the side of the substrate 1 when a clearance is formed between the substrate 1 and the frame body 8a, whereby the pressure in the peripheral portion of the substrate 1 can be increased to smash adhesive between the substrate 1 and substrate 2 in a stable manner. Consequently, shifts between substrates can be further decreased and uniformity in gaps between substrates can be secured.

It should be noted that while the frame body is disposed like a picture frame, it is preferable to make it to be of divided type since torsion is apt to occur when it is of uniform type. Especially in case metal materials are employed, it is required to make it of divided type as a measure for coping with deformation for the same reasons as described above.

As explained so far, the apparatus for manufacturing a liquid crystal panel according to the first aspect of the present invention is an apparatus for manufacturing a liquid crystal panel in which two substrates are faced to each other with spacers interposed therebetween, applied with heat and pressure in an overlapped condition, and adhesive arranged between the two substrates is cured for fixing, wherein at least one of a pair of pressurizing plates for applying pressure to the two substrates is a graphite plate and in that upper and lower pressurizing plates are made to be of different rigidity. With this arrangement, the graphite plate of low rigidity is made to stick to the substrate, and shifts between substrates can be prevented while securing uniformity in gaps between substrates.

According to another embodiment of the present invention, at least one of the pressurizing plates is of a multi-layered arrangement, and a graphite plate is employed as a part of the multi-layered arrangement, and according to a further embodiment of the present invention, the pressurizing plate of multi-layered arrangement is provided with an inner space in at least one point positioned between the layers. With these arrangements, the soaking characteristics of the graphite plates can be improved, and shifts between substrates can be further restricted while further securing uniformity in gaps between substrates.

According to a still further embodiment of the present invention, the pressurizing plate of multi-layered arrangement is provided with a path for cooling at a nearer side with respect to the substrate and with a heater at a farther side with respect to the substrate. With this arrangement, the soaking characteristics of the substrates can be improved, rapid cooling/heating is made possible, and improvements in quality and productivity can be obtained.

According to a yet further embodiment of the present invention, a coating film is provided on a surface of the graphite plate. With this arrangement, a long-term duration of the graphite plate is enabled and improvements in yield and accuracy of the product can be obtained.

According to another embodiment of the present invention, a graphite plate of high rigidity is fixed to a base by means of a pin or a heat insulator in order to deform a surface of the graphite plate in a convex or concave manner.

With this arrangement, the shapes of the finally obtained substrates can be controlled.

According to a further embodiment of the present invention, there is provided a mechanism in which a closed space is formed by means of a pressurizing plate of low rigidity and an upper lid, and a substrate disposed in an exterior space with respect to the closed space is applied with pressure by making a pressure of the closed space higher relative to the exterior space, whereby occurrence of bubbles in adhesive that is applied between the substrates can be prevented. Consequently, leakage of liquid crystal can be prevented and yield can be improved.

According to a still further embodiment of the present invention, a frame body of a thickness approximately identical to that of the two substrates is arranged between the pair of pressurizing plates as to enclose the substrates, wherein the frame body is formed of tungsten, molybdenum, alloys thereof, graphite or iron-nickel alloy. With this arrangement, the graphite plates are made to uniformly contact the substrates in flat conditions and shifts between substrates can be restricted.

According to a yet further embodiment of the present invention, differences in level are provided in the frame body, wherein the differences in level are set such that a height of an inner surface located on the side of the substrate is identical to or lower than the height of the substrate, and that a height of an outer surface on the opposing side is higher than the height of the inner surface, whereby the pressure in the peripheral portion of the substrates can be increased and adhesive can be smashed in a stable manner. With this arrangement, shifts between substrates can be further decreased and uniformity in gaps between substrates can be secured.

The method for manufacturing a liquid crystal panel according to the second aspect of the present invention is a method for manufacturing a liquid crystal panel in which two substrates are faced to each other with spacers interposed therebetween, applied with heat and pressure in an overlapped condition, and adhesive arranged between the two substrates is cured for fixing, wherein at least one of a pair of pressurizing plates for applying pressure to the two substrates is a graphite plate and in that upper and lower pressurizing plates are made to be of different rigidity. With this arrangement, the graphite plate of low rigidity is made to stick to the substrate, and shifts between substrates can be prevented while securing uniformity in gaps between substrates.

What is claimed is:

1. A method manufacturing a liquid crystal panel comprising the steps of:

facing two substrates toward each other with spacers interposed therebetween;

applying heat and pressure in an overlapped condition; and curing adhesive arranged between the two substrate for fixing, wherein at least one of a pair of pressurizing plates for applying pressure to the two substrates is of a material having thermal expansion coefficient close to that of the two substrates, and wherein the pair of pressurizing plates are made to be of different rigidity.

2. The method of claim 1, further comprising the steps of:

forming a closed space by means of a pressurizing plate of low rigidity and an upper lid; and applying pressure to the two substrates disposed in an exterior space with respect to the closed spaced by making a pressure of the closed space higher relative to the exterior space.

3. The method of claim 1, further comprising the step of arranging a frame body between the pair of pressurizing plates so as to enclose the two substrates, wherein the frame body has a thickness approximately identical to that of the two substrates and is formed of tungsten, molybdenum, alloys thereof, graphite or iron-nickel alloy.

4. The method of claim 3, wherein differences in level are provided in the frame body, wherein the differences in level are set such that a height of an inner surface located on a side of the substrates is identical to or lower than a height of the substrate, and that a height of an outer surface on an opposing side is higher than the height of the inner surface.

5. A method for manufacturing a liquid crystal panel comprising the steps of:

facing two substrates toward each other with spacers interposed therebetween;

applying heat and pressure in an overlapped condition; and curing adhesive arranged between the two substrates for fixing, wherein at least one of a pair of pressurizing plates for applying pressure to the two substrates is of a multi-layered arrangement.

6. The method of claim 5, further comprising the step of providing the pressurizing plate of multi-layered arrangement with an inner space in at least one point positioned between layers of the multi-layered arrangement.

7. The method of claim 5, further comprising the step of providing the pressurizing plate of multi-layered arrangement with a path for cooling at a nearer side with respect to the substrate and with a heater at a farther side with respect to the substrate.

8. A method for manufacturing a liquid crystal panel comprising the steps of:

facing two substrates toward each other with spacers interposed therebetween;

applying heat and pressure in an overlapped condition; and curing adhesive arranged between the two substrates for fixing, wherein a surface of a pressurized plate of high rigidity of a pair of pressurized plates for applying pressure to the two substrates is deformed in convex or concave manner, and wherein the pair of pressurizing plates are made to be of different rigidity.

* * * * *